Patented Apr. 16, 1929.

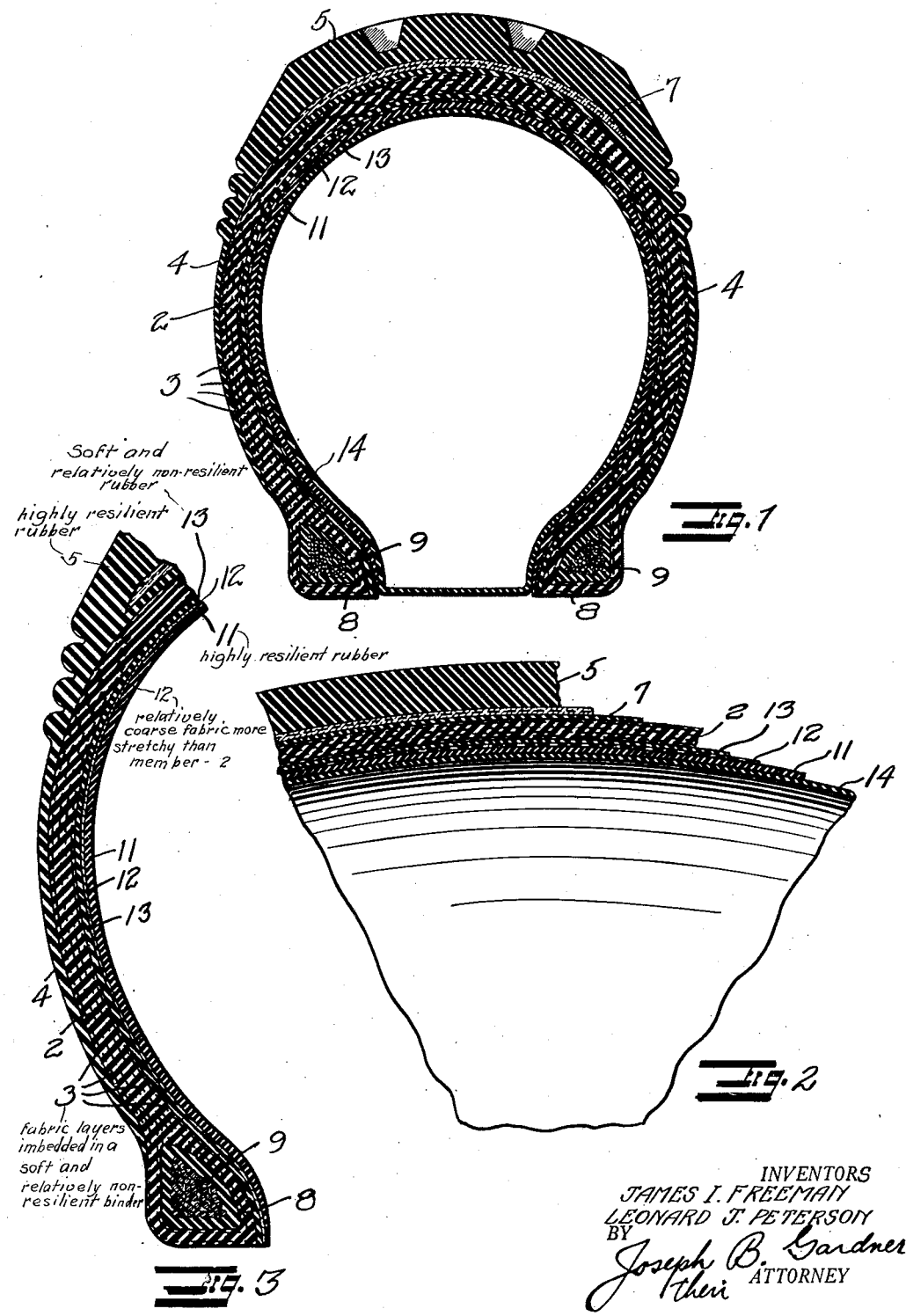

1,709,124

UNITED STATES PATENT OFFICE.

JAMES I. FREEMAN AND LEONARD J. PETERSON, OF MODESTO, CALIFORNIA, ASSIGNORS OF ONE-THIRD TO ALBION F. PETERSON, OF OAKLAND, CALIFORNIA.

TIRE CASING.

Application filed May 25, 1925. Serial No. 32,617.

Our invention relates to a pneumatic tire casing, and particularly to a casing structure having an integral inside cushion for enhancing the distribution of concentrated shocks administered to the casing.

An object of the invention is to provide a casing of the character described in which all parts are uniformly adapted for the effective distribution and assimilation of localized thrusts.

Another object of the invention is to provide a casing of the character described which will involve a minimum increase in the thickness of the tire walls.

A further object is to provide the casing with an integral internal cushion which will not vulcanize with the inner tube when subjected to excessive temperatures during the use of the tire.

The invention possesses other objects and features of advantages, some of which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to said drawings:

Figure 1 is a cross-sectional view of a tire formed in accordance with our invention.

Figure 2 is a view of a portion of the tire as shown in Figure 1, on a larger scale.

Figure 3 is a longitudinal sectional view of a portion of the tire.

The present invention involves certain improvements over the tire casing as disclosed by us in Letters Patent Number 1,407,401, granted on February 21, 1922. As shown in the drawings the casing of the present invention comprises a carcass 2 which may be formed with plies 3 of fabric or cord structure as desired; the drawings, however, show the former. Formed on the exterior of the carcass are the rubber side walls 4 and the tread 5, a breaker strip 7 being preferably interposed between the carcass and the tread. The edges 8 of the carcass, as in the usual standard construction, are provided with beads 9 of suitable design.

Extending completely around the inner side of the carcass from one edge 8 to the other is a cushion 11 which is formed of rubber of a degree of hardness approaching, but softer than, that of the tread 5. The cushion, as here shown, is of substantially uniform thickness throughout its length; a comparatively sharp taper, however, occurs adjacent the edges. Paralleling the comparatively hard cushion 11 and extending therewith completely around the inner side of the carcass is a comparatively soft cushion 13 of rubber of a composition which will permit of ready vulcanization to the cushion 11 and to the carcass. Interposed between the cushions 11 and 13 is a reenforcing strip 12 made of textile material woven in a fabric of coarse mesh and capable of being stretched to a greater degree than that permitted by the carcass 2. The coarse mesh of the strip 12 allows of the extension therethrough of portions of each cushion for integral engagement with the other. In this manner a firm bond will be effected between the cushions and strip and they will become an integral part of the casing. The strip 12 preferably extends with the cushions to the edges of the carcass so that a uniform binding of the cushions is maintained throughout the length of the carcass.

The cushion 13 is preferably of uniform thickness throughout its length, and is relatively thin so that with the use of soft rubber of ordinary compound there will be no danger of longitudinal displacement of the associated members when the tire becomes heated while in use. On the other hand, owing to the comparative hardness of the cushion 11, no such limitation of its thickness is advisable, and no danger of vulcanization as between said cushion and the inner tube 14 will be occasioned.

It will now be clear that when a thrust is directed inwardly against the casing from the exterior thereof and concentrated upon a small area, the cushions 11 and 13, particularly the former, will resiliently resist the pinching or the acute bending of the carcass or the inner tube; at the same time the reinforcing strip 12 will prevent undue stretching and possible rupture of the cushion. It is to be noted that particularly will the hard cushion 11 and the reinforcing strip 12 be of advantage at the side walls of the casing since such portions of the casing do not have the reenforcement provided by the tread and are also subjected to the sharpest flexures.

A feature of advantage is had by our construction in that the thickness of the cushions is practically uniform from bead to bead. By reason of such uniformity, or in other words, by reason of the absence of relatively weak portions, there will be completely eliminated the premature breaking down of the side wall structure caused by continuous flexing of the walls concentrated at the portion offering the least resistance. Furthermore, such uniformity of the inner cushions is particularly advantageous in connection with low pressure tires, since in this type of tire all portions of the casing are designed to flex uniformly.

We claim:

1. A tire casing comprising a carcass, a tread, a cushion of softer material than said tread forming an integral part of the carcass and arranged at the inner side thereof, the edges of said cushion terminating adjacent the edges of said carcass, a cushion of softer material than the first arranged over the same, and a reenforcing strip interposed between said cushions.

2. A tire casing comprising a carcass, a tread on the outer side of said carcass, a rubber cushion on the inner side of said carcass united integrally with the same, and a reenforcing strip spaced from said carcass and interposed between same and said cushion and capable of being stretched to a greater degree than the carcass.

3. A tire casing comprising a carcass, a tread on one side thereof, a cushion at the other side of said carcass, a binding cushion of softer material than the material of said first cushion interposed between said carcass and first cushion, and a reinforcing strip between and united with said cushion and capable of being stretched to a greater degree than said carcass.

4. A tire casing comprising a carcass, a tread on one side thereof, a rubber cushion of uniform thickness arranged on the other side thereof and extending from substantially one edge of the carcass to the other, a cushion of uniform thickness and of relatively soft rubber interposed between said carcass and cushion, and a reinforcing strip between and united with said cushions and capable of being stretched to a greater degree than said carcass.

5. A tire casing comprising a carcass, a tread on one side thereof, a rubber cushion of uniform thickness arranged on the other side of said carcass and extending from substantially one edge of the carcass to the other, a binder of uniform thickness and relatively soft rubber interposed between and integrally uniting said carcass and cushion and extending from one edge of the carcass to the other, and a reenforcing strip interposed between said cushion and binder and extending substantially from one edge of the carcass to the other and being capable of stretching to a greater degree than the carcass.

6. A tire casing comprising a carcass, a tread, a cushion forming an integral part of said carcass and arranged at the inner side thereof, the edges of said cushion terminating adjacent the edges of said carcass, a cushion softer than the first and interposed between same and said carcass, and reenforcing means between the cushions.

In testimony whereof, we have hereunto set out hands at Oakland, California, this 22nd day of May, 1925.

JAMES I. FREEMAN.
LEONARD J. PETERSON.